(12) United States Patent
Carron et al.

(10) Patent No.: US 12,247,880 B1
(45) Date of Patent: Mar. 11, 2025

(54) SPECTROMETER

(71) Applicant: MKS TECHNOLOGY, Centennial, WY (US)

(72) Inventors: Keith T. Carron, Centennial, WY (US); Shane A. Buller, Laramie, CO (US); Mark A. Watson, Laramie, WY (US); Sean Patrick Woodward, Laramie, WY (US)

(73) Assignee: METROHM SPECTRO, INC., Plainsboro, NJ (US)

( * ) Notice: Subject to any disclaimer, the term of this patent is extended or adjusted under 35 U.S.C. 154(b) by 0 days.

(21) Appl. No.: 17/403,473

(22) Filed: Aug. 16, 2021

Related U.S. Application Data

(63) Continuation of application No. 16/430,402, filed on Jun. 3, 2019, now Pat. No. 11,092,494, which is a continuation of application No. 15/610,211, filed on May 31, 2017, now abandoned.

(60) Provisional application No. 62/343,837, filed on May 31, 2016.

(51) Int. Cl.
*G01J 3/44* (2006.01)
*G01N 21/65* (2006.01)

(52) U.S. Cl.
CPC ............ *G01J 3/4412* (2013.01); *G01N 21/65* (2013.01)

(58) Field of Classification Search
CPC ........ G01J 3/28; G01J 3/26; G01J 3/18; G01J 3/00; G01J 3/02; G01J 3/44; G01N 21/65; A61B 5/0075
See application file for complete search history.

(56) References Cited

U.S. PATENT DOCUMENTS

| | | | | |
|---|---|---|---|---|
| 5,596,411 A | * | 1/1997 | Fanton | G01N 21/211 356/453 |
| 6,181,474 B1 | * | 1/2001 | Ouderkirk | G02B 21/0052 250/252.1 |
| 7,652,763 B2 | | 1/2010 | Matousek et al. | |
| 7,663,748 B2 | * | 2/2010 | Van Beek | G02B 21/247 356/317 |
| 7,911,604 B2 | | 3/2011 | Matousek et al. | |
| 8,085,396 B2 | | 12/2011 | Matousek et al. | |
| 8,159,664 B2 | | 4/2012 | Matousek et al. | |
| 8,248,600 B2 | | 8/2012 | Matousek et al. | |

(Continued)

*Primary Examiner* — Abdullahi Nur
(74) *Attorney, Agent, or Firm* — FisherBroyles, LLP; Thomas J. Osborne, Jr.

(57) ABSTRACT

A spectrometer, such as a Raman spectrometer, adapted for analyzing a complex sample is provided. In an example implementation, the spectrometer may be able to determine one or more spectral characteristics of an inner subsurface layer or region of a complex sample (e.g., contents of a container). In one embodiment, for example, A spectrometer includes an excitation source configured to provide an excitation signal; an optical system configured to direct the excitation signal toward a sample and receive a spectroscopy signal from the sample. The optical system may include a spatial filter configured to separate or isolate at least one first portion of the spectroscopy signal from at least one second portion of the spectroscopy signal and pass the at least one first portion of the spectroscopy signal. A detector is configured to determine at least one spectral feature of the at least one first portion of the spectroscopy signal.

20 Claims, 16 Drawing Sheets

(56) References Cited

U.S. PATENT DOCUMENTS

| | | | |
|---|---|---|---|
| 2002/0039184 A1* | 4/2002 | Sandusky | G01J 3/0229 356/369 |
| 2008/0129991 A1* | 6/2008 | Bakker | G01J 1/4228 370/399 |

* cited by examiner

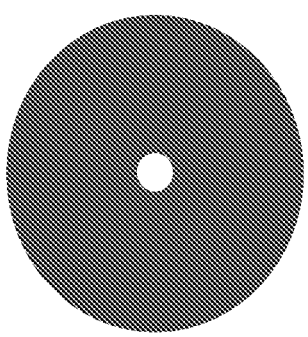
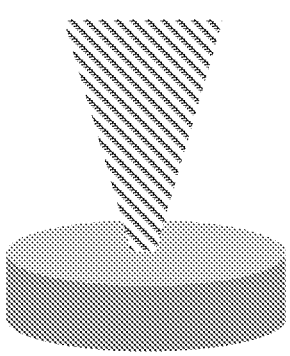
Non-diffuse sample
FIGURE 2A
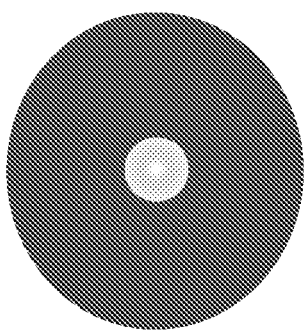
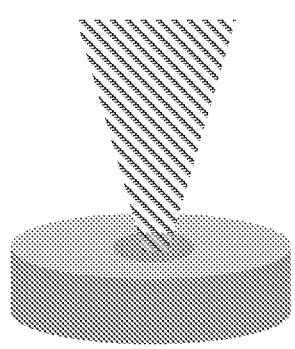
Diffuse sample
FIGURE 2B
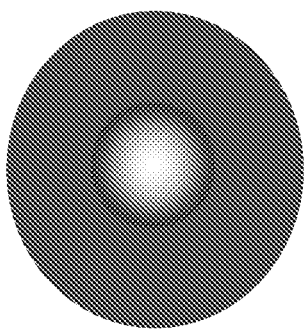
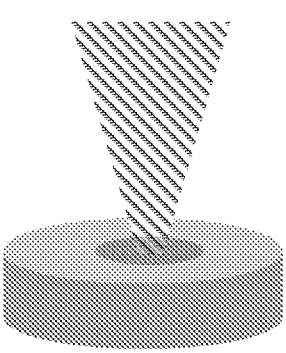
Highly diffuse sample
FIGURE 2C Translucent Barrier Impenetrable Barrier

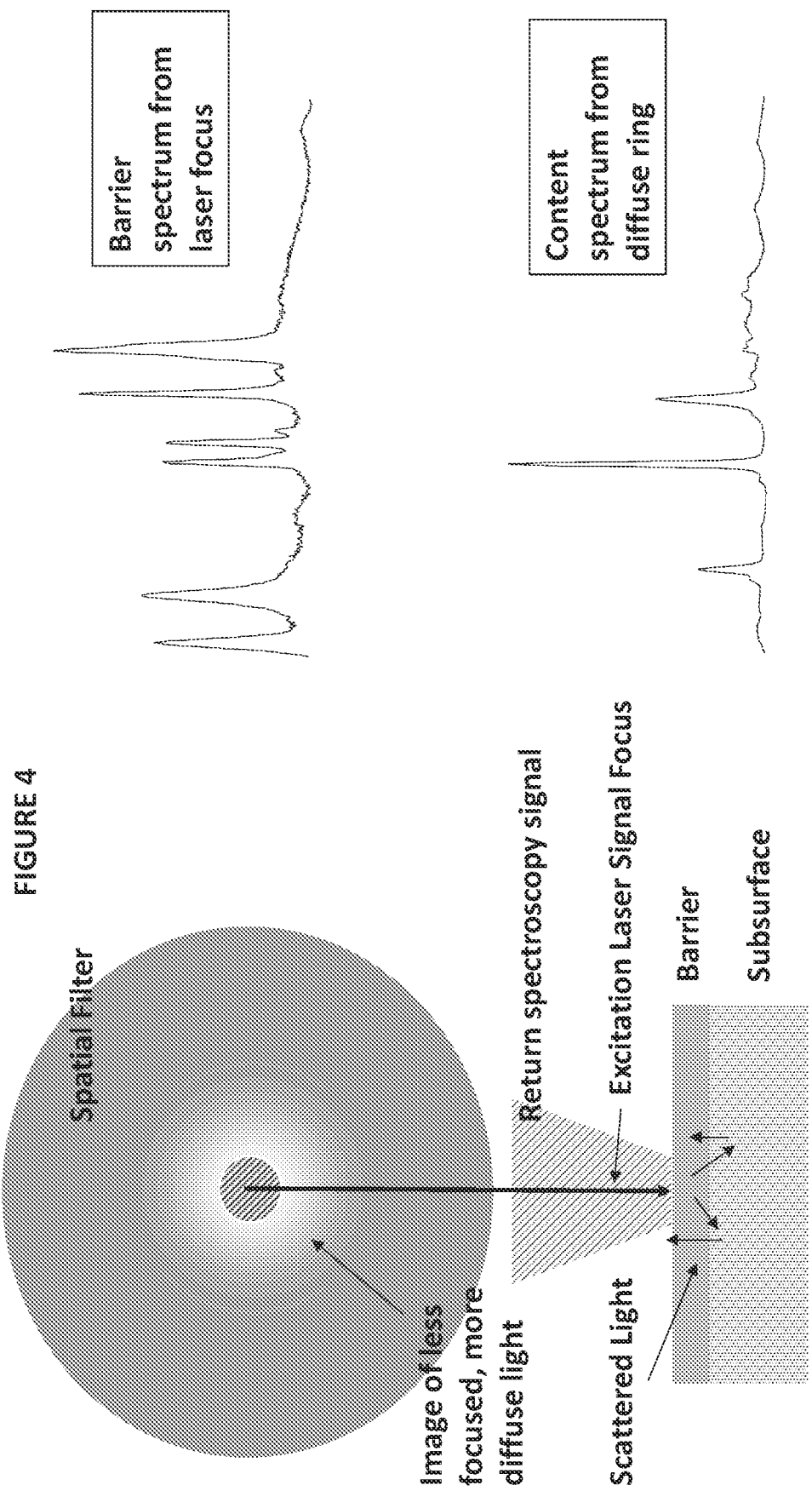

Reflection Objective

SPECTROMETER

CROSS-REFERENCE TO RELATED APPLICATIONS

This application is a continuation of U.S. application Ser. No. 16/430,402 entitled Spectrometer and filed on Jun. 3, 2019, which is a continuation of U.S. patent application Ser. No. 15/610,211 entitled "Spectrometer" and filed on May 31, 2017, which claims the benefit of U.S. provisional application No. 62/343,837 entitled "Spectrometer" and filed on May 31, 2016, each application of which is hereby incorporated by reference in its entirety including all appendices filed therewith as though fully set forth herein.

This application is also related to U.S. patent application Ser. No. 13/907,812 entitled "Spectrometer," filed on May 31, 2013 and published as United States patent publication no. US 2014/0104611 A1, which is incorporated by reference in its entirety as though fully set forth herein.

This application is also related to U.S. patent application Ser. No. 14/874,378 entitled "Spectrometer," filed on Oct. 2, 2015 and published as United States patent publication no. US 2016/0223400 A1, which is incorporated by reference in its entirety as though fully set forth herein.

BACKGROUND

The present disclosure relates to a spectrometer adapted for analyzing a complex sample.

BRIEF SUMMARY

A spectrometer, such as but not limited to a Raman spectrometer, adapted for analyzing a complex sample is provided. In some implementations, for example, the spectrometer may be able to determine one or more spectral characteristics of an inner subsurface layer or region of a complex sample (e.g., contents of a container).

In some implementations, for example, the spectrometer is adapted to selectively isolate or separate one or more portion of a spectroscopy signal received from the sample and from another one or more portion of the spectroscopy signal. One or more of portions separated from all or a portion of the remaining spectroscopy signal may be directed to one or more detector and one or more of the remaining one or more other portions of the spectroscopy signal may be blocked from the detector(s) (although the other portion may, in some implementations, be directed to a different detector or to the same detector at the same time).

For example, a spatial filter or other optical component of the spectrometer may be configured to selectively pass one or more portion of a spectroscopy signal received from the complex sample to a detector of the spectrometer, while also being configured to block one or more other portion of the spectroscopy signal from reaching the detector of the spectrometer, at least at the same time as the passed portion is directed toward the detector. In one implementation, for example, the spatial filter comprises at least one aperture configured to pass a portion of the spectroscopy signal through the at least one aperture and pass that portion of the spectroscopy signal toward a detector of the spectrometer.

In contrast to prior solutions that create a spatial offset between an excitation region and a collection region of the sample, a number of implementations disclosed herein are instead adapted to receive a collective spectroscopy signal from a sample (e.g., via an epi-illumination spectrometer) and process that spectroscopy signal within the spectrometer to isolate or separate at least a portion of the spectroscopy signal for analysis. Isolated or separated portions of the spectroscopy signal, for example, may be separated based on spatial relationships and/or one or more other features of the spectroscopy signal.

In another implementation, a system for analyzing a complex sample is provided. In this implementation, for example, the system may comprise one or more spectrometers that are configured to analyze a complex sample as described herein.

In other implementations, methods for analyzing a complex sample are provided by performing providing the operations described herein with respect to the various implementations of spectrometers and/or filters (e.g., spatial filters described herein). The methods may further comprise analyses such as analyzing one or more spectral features detected from one or more portions of a spectroscopy signal, analyzing one or more spectral features detected from one or more other portions of the spectroscopy signal, analyzing one or more spectral features detected from the entire spectroscopy signal, comparing one or more spectral features identified from one detection to one or more spectral features identified from one or more other detection, using one or more mixture matching algorithms to analyze one or more spectral features identified, using a principle component analysis to analyze one or more spectral features identified, and/or using one or more look up tables to identify a component of the complex sample from one or more spectral features identified.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 2A through 2C show three examples implementations of spectroscopy signal sampling patterns at a spatial filter of a spectrometer optical system, according to one or more embodiments shown and described herein.

FIG. 4 shows a schematic diagram of an example implementation of a less focused or more diffusely imaged spectroscopy signal imaged on a spatial filter of a spectrometer, according to one or more embodiments shown and described herein.

DETAILED DESCRIPTION

A spectrometer (e.g., a Raman or luminescence (e.g., fluorescence, phosphorescence, chemilluminescence) spectrometer) is provided that is configured to analyze a complex signal (e.g., analyze one or more different layers, zones, regions, components or other features of the complex sample). The spectrometer, for example, may reduce interference caused by a material disposed adjacent (directly or indirectly adjacent) and/or proximate (e.g., in close proximity) to a sample of interest. In various implementations, the material causing interference with a spectroscopy signal of a sample of interest may include a container (e.g., a test tube, plastic container, etc.) or another material located proximate (e.g., in close proximity) to the sample of interest (e.g., subsurface layers, zones or regions, adjacent or nearby layers, zones or regions, contents of a container). Although particular types of spectrometers are described below (e.g., Raman and fluorescent), these are merely examples of spectrometers that may be used in a similar manner to reduce interference in a spectroscopy signal.

In some implementations, for example, one or more portions of a spectroscopy signal (e.g., different zones, regions, portions) may be separated or isolated from one or more other portions of the spectroscopy signal for analysis separate from the other portions of the spectroscopy signal. In one implementation, for example, one or more portions of a spectroscopy signal may be passed to a detector of a spectrometer while one or more other portions of the spectroscopy signal may be blocked from reaching at least the same detector at least at the same time such that the portion(s) may be separately analyzed. The results of the separate analysis may be used on their own or in combination with one or more other analyses (e.g., an entire spectroscopy signal and/or another portion of the spectroscopy signal).

Figure 1:
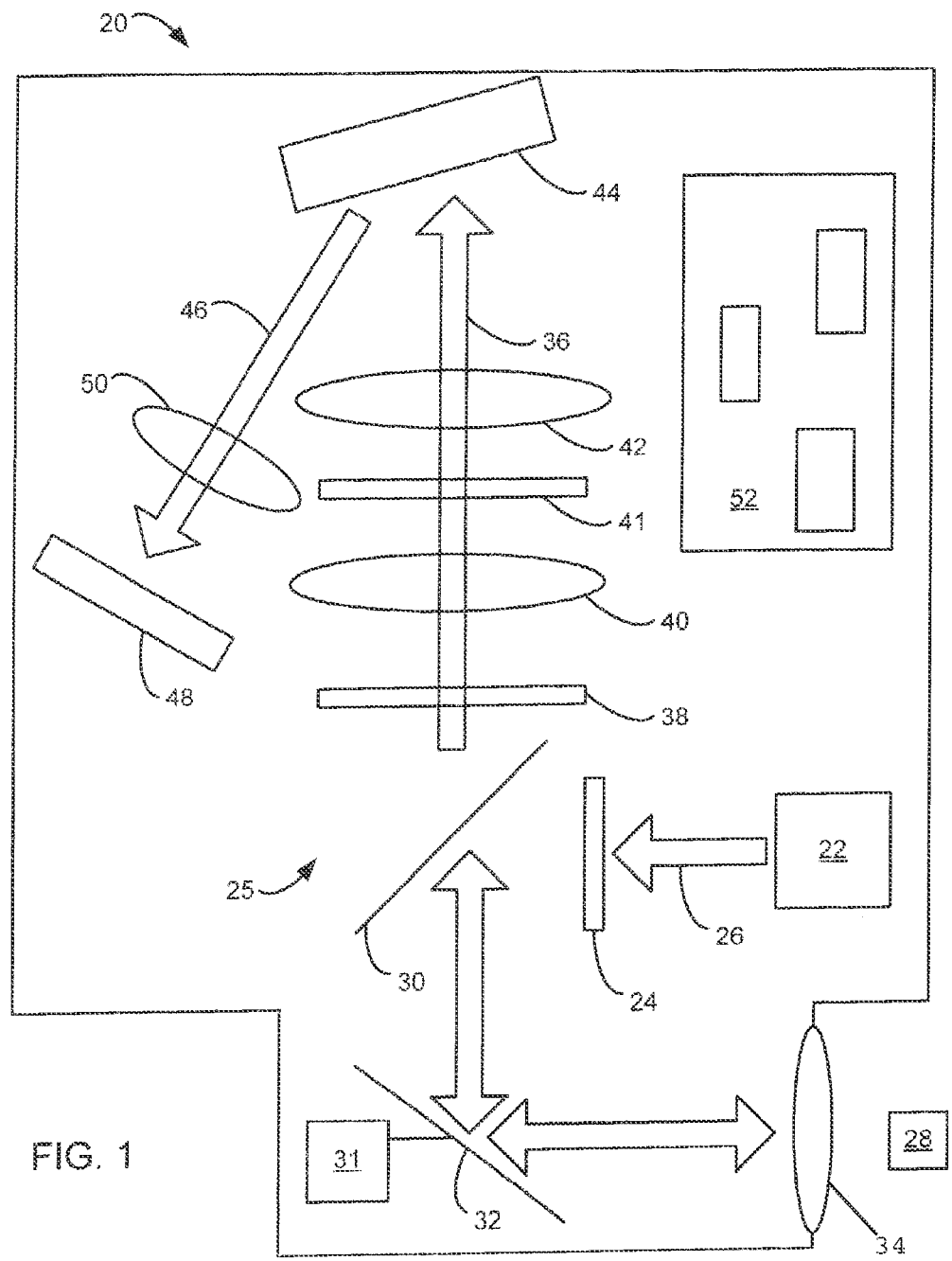
FIG. 1 shows a schematic diagram of an example implementation of a spectrometer configured to illuminate a complex sample by directing an excitation signal, receiving a spectroscopy signal in return from the sample and determining a spectral component of the spectroscopy signal corresponding to one or more component(s) of the complex sample, according to one or more embodiments shown and described herein.

FIG. 1 shows an example embodiment of a spectrometer 20 configured to illuminate a complex sample (e.g., a multi-layered sample) by directing an excitation signal (e.g., an excitation light signal), receive a spectroscopy signal in return from the sample and determine a spectral component of the spectroscopy signal corresponding to one or more component(s) of the complex sample. In one example implementation of FIG. 1, for example, the spectrometer may simply provide the excitation signal at a single illumination region of the sample and receive the spectroscopy signal from the same region. In an example epi-illumination configuration such as shown in FIG. 1, for example, the excitation signal may be directed to (e.g., focused on) a sample by an objective and the spectroscopy signal is received along the same path (e.g., through the same objective). By analyzing the spectroscopy signal in the spectrometer, at least one spectral component corresponding to at least one component of the complex sample may be determined. In one implementation, for example, a portion of the spectroscopy signal may be isolated or separated (e.g., optically, electrically, mechanically and/or algorithmically) from the spectroscopy signal received from the sample. One or more spectral component of at least one component of the complex sample may then be identified from the isolated or separated portion of the spectroscopy signal. This spectral component may, for example, then be used to identify one or more component (e.g., layer) of the complex sample.

Although the particular example described with reference to FIG. 1 is a Raman spectrometer, other types of spectrometers, such as a luminescence spectrometer, could readily be designed based on the description herein. As shown in FIG. 1, the spectrometer 20 comprises an excitation source 22. In a Raman spectrometer, for example, the excitation source 22 typically comprises a laser light source. In one embodiment, for example, the excitation source 22 comprises a diode laser. A diode laser, for example, is capable of providing a plurality of wavelengths from the excitation source 22. In this implementation, the spectrometer 20 further comprises a filter 24. The filter 24 filters the output of the excitation source 22, such as removing spurious emissions from the excitation source 22.

The spectrometer 20 further comprises an optical system 25. The optical system 25 directs the incident beam 26 toward a sample 28 and receives a spectroscopy signal from the sample 28. In the embodiment shown in FIG. 1, for example, the optical system 25 comprises a dichroic beamsplitter mirror 30. However, the incident beam 26 may be directed at sample 28 without any intervening instrument components located in the path of incident beam 26. The incident beam 26 also may be directed at a mirror, a holographic transmissive element, a mirror formed with a hole in the mirror or any other means for directing, focusing and/or de-focusing (e.g., collimating) an incident beam known in the art.

In one implementation, the optical system 25 may be further configured to move the incident beam across a surface of the sample 28. In one embodiment, for example, an actuator assembly 31 moves (e.g., vibrates) one or more element of the optical system 25 (e.g., a moveable mirror 32) to move a focused beam across a surface of the sample 28. The actuator assembly 31, for example, may control the moveable mirror 32 to move a focused incident beam 26 across a surface of the sample 28. The actuator assembly 31, for example, may control the moveable mirror 32 to move the incident beam in any path or pattern across the surface of the sample 28. In one implementation, for example, the actuator assembly 31 may control the moveable mirror 32 in such a manner as to trace one or more line, circle, elliptical or other paths across the surface of the sample. Examples of systems, methods and apparatuses configured to control an excitation beam to move the beam relative to a sample are described in United States patent application U.S. patent application Ser. No. 13/907,812 entitled "Spectrometer" filed by Carron et al. on May 31, 2013 (the '812 application), which is incorporated by reference in its entirety as if fully set forth herein.

The incident beam 26 may further be directed through a lens 34. In one embodiment, the lens 34 comprises a focusing lens in the path of the incident beam 26. The focusing lens couples the incident beam 26 with the sample 28 and collects the spectroscopy signal (e.g., Raman scattered light) from the sample. In another embodiment, more than one lens 34 may be located in the path of the incident beam 26 before the incident beam 26 contacts the sample 28. In various embodiments, the spectrometer 20 may include other optical elements for directing an incident beam 26 toward a sample and collecting a spectroscopy signal from the sample. The optical system of the spectrometer 20, for example, may include elements such as a collimated beam tube or a fiber optic waveguide. See, e.g., U.S. Pat. No. 7,403,281 for examples of collimated beam tubes or fiber optic waveguides that may be used in optical systems of various spectrometers.

The incident beam 26 induces or generates on contact with the sample 28 a spectroscopy signal to be detected by the spectrometer 20. In Raman spectroscopy, for example, the incident beam 26 induces or generates on contact with the sample 28 scattered radiation having an energy differential different from, and one or more wavelengths different than, the incident radiation 26, or the Raman shift that, for convenience, is described in this document as a Raman beam. As stated above, and as shown in FIG. 1, in one embodiment the spectrometer 20 comprises a beam-splitter, such as a dichroic beam-splitter mirror 30. The spectroscopy signal 36 (e.g., Raman beam) is directed back through the lens 34 and the dichroic beam-splitter mirror 30 in a 180 degree back-scatter geometry. Neither the incident beam 26 nor the spectroscopy signal 36 need be co-linear. In the embodiment shown in FIG. 1, however, the spectroscopy signal 36 passes back through the dichroic beam-splitter mirror 30 and then through a filter element 38. In one embodiment, the filter element 38 comprises a long pass filter that removes extraneous radiation (e.g., from the light source 22 or another source) prior to dispersing the spectroscopy signal 36 into a spectrum. Alternatively, the filter element 38 may comprise a notch filter, or any other filter that is capable of rejecting elastically scattered radiation.

The spectroscopy signal 36 may further pass through an input focusing lens 40 that focuses the spectroscopy signal 36 to a point at a spatial filter 41. In one embodiment, for example, the spatial filter 41 comprises an aperture, slit or notch and is located at the focal point of the input focusing lens 40. The spatial filter 41 spatially filters the beam at the focal point of the input focusing lens. As described herein, the spatial filter 41 may be configured to isolate or separate a portion of the spectroscopy signal 36. In various implementations, for example, the spatial filter 41 may, for example, be moveable or otherwise configured to isolate and/or separate a portion of the spectroscopy sample for analysis separate from the overall spectroscopy signal 36 and/or another independent or overlapping portion of the spectroscopy signal 36.

The spectrometer 20 shown in FIG. 1 further comprises a collimating lens 42 that collimates the diverging spectroscopy signal 36 or portion thereof after it has passed through an aperture of the spatial filter 41 (e.g., an aperture, slit or notch). The collimating lens 42 further directs the re-collimated Raman beam or portion thereof toward a diffraction grating 44. The diffraction grating 44 comprises an optical element that divides a Raman beam into spatial separated wavelengths. The diffraction grating 44 further directs a divided Raman beam 46 toward a detector 48. The divided Raman beam 46 or portion thereof passes through a detector focusing lens 50 that focuses the spatially separated wavelengths of the divided Raman beam 46 or portion thereof onto the detector 48.

The detector 48 comprises a transducer that converts optical energy into an electrical signal. In one embodiment, for example, the detector 48 comprises an array of individual transducers that create an electrical pattern representing the spatially separated wavelengths of the Raman spectrum or portion thereof. A charge-coupled device (CCD) array, for example, may be used as the detector 48 in one embodiment of the invention. In another embodiment, an Indium-Gallium-Arsenide (InGaAs) detector 48. Other detectors known in the art may also be used within a spectrometer.

The spectrometer 20 further comprises control electronics 52 for controlling the operation of the spectrometer 20. The control electronics 52, for example, may control the operation of the light source 22, the actuator assembly 31, the spatial filter 41, the detector 48, temperature control elements (e.g., for the light source or detector), and data transfer to and/or from the spectrometer. In one embodiment, the control electronics 52 may be integrated onto a single PC board within a housing of the spectrometer. The control electronics 52 may also comprise one or more discrete component(s) and/or one or more integrated circuit component(s).

In one embodiment, the control electronics 52 may be further configured to communicate with an external device. The control electronics 52, for example, may comprise a wired or wireless communication port for communicating with an external computer, personal data assistant (PDA), smartphone, tablet, network or the like. A wired communication port, for example, may comprise a parallel, serial, universal serial bus (USB), FireWire™, IEEE 1394, Ethernet, modem, cable modem or other wired communication port known in the art. A wireless communication port, for example, may comprise an antenna for wireless communicating with an external device, such as via and infrared, Bluetooth, IEEE 802.11a/b/g, IrDA, a wireless modem or other wireless communication port known in the art. The control electronics 52 may be powered from a battery for a portable device or may include a power input for receiving power from an external supply as known in the art. A battery or power supply circuit (e.g., a rectifier) may be located within a housing of the spectrometer 20.

In a Raman spectroscopy implementation, for example, the spectrometer 20 operates to detect a Raman spectrum of a sample 28. In order to detect the Raman spectrum, the light source 22 is activated to generate an incident beam 26 of excitation radiation, such as generating a laser incident beam in a laser light source. In one embodiment, for example, the temperature of the light source 22 is controlled to control the output frequency of the incident beam 26 generated by the light source 22. The incident beam 26 of excitation radiation passes through the filter 24, which removes spurious emissions from the incident beam. The incident beam 26 is reflected off the beam-splitter mirror 30 toward the sample 28. The incident beam 26 is focused onto the sample 28 by the output focusing lens 34.

The incident beam 26, in a Raman spectrometer implementation, generates Raman scattered light from the sample 28. The Raman scattered light is received by the output focusing lens 34 and transmitted back through the beam-splitter mirror 30. In this embodiment, the beam-splitter mirror 30 passes the Raman scattered light through the mirror 30 to the filter 38. From the filter 38, the Raman scattered light passes through the input focusing lens 40 and is focused onto a spatial filter 41 such as an aperture, slit or notch. The Raman scattered light is spatially filtered and diverges toward the collimating lens 42. The spatial filter 41 may further be configured to isolate or separate a portion of the Raman scattered light (during all or a portion of the samples) and pass the isolated or portion of the Raman scattered light toward the detector of the spectrometer. The collimating lens 42 collimates the diverging Raman scattered light (or portion thereof) and transmits the light passed through the spatial filter 41 to the diffraction grating 44, which divides the Raman scattered light (or portion thereof) into spatial separated wavelengths and directs the wavelengths towards the detector element 48. The spatially separated wavelengths of the Raman scattered light pass through the detector focusing lens 50 and are focused into a focused band of radiation that represents the spatially separated wavelengths of the Raman scattered light. The focused band of radiation is further directed by the detector focusing lens 50 onto the detector 48.

In this particular implementation, the detector 48 comprises an array of individual transducers that each generate an electrical signal corresponding to intensity of the radiation received at each of the individual transducers. The electrical signals generated at the individual transducers of the detector represent the spatially separated wavelengths of the Raman spectrum of the sample 28. The electrical signals are read from the detector by the control electronics 52. In one embodiment, for example, the spectrometer 20 may then present the Raman spectrum detected to a user such as via a display or indicator on the spectrometer itself. In another embodiment, the control electronics of the spectrometer 20 may comprise a look-up table stored in a data storage element (e.g., memory, tape or disk drive, memory stick or the like). In this embodiment, the control electronics 52 compares the signal from the detector with the values stored in the look-up table to determine a result of the Raman scan. The spectrometer 20 then presents the result to a user such as via a display or indicator on the spectrometer. The result, for example, may indicate the presence or absence of one or more chemicals or substances in the sample and may further indicate an amount or concentration of a chemical or substance detected by the spectrometer.

In other implementations, the detector 48 may comprise one or more individual transducers that rapidly scan for one or more anticipated spectral features (e.g., Raman features).

An example such system is disclosed in U.S. patent application Ser. No. 13/161,485 entitled "Spectrometer" and filed by Carron et al. on Jun. 15, 2011, which is hereby incorporated herein by reference in its entirety for all that it teaches and suggests.

FIGS. 2A through 2C show three examples spectroscopy signal sampling patterns at a spatial filter (e.g., aperture) of a spectrometer optical system. In the first example, a focused or non-diffuse spectroscopy is tightly focused to a small point located at an aperture of a spatial filter. In this example, the tightly focused spectroscopy provides a theoretic exact image of the sample at the aperture of the spatial filter. FIG. 2B shows a second example in which a spectroscopy signal is more diffuse or less tightly focused at the spatial filter (e.g., aperture) than the example shown in FIG. 2A. FIG. 2C shows a third example of an even more highly diffuse or even less focused spectroscopy signal at the spatial filter (e.g., aperture). By allowing the spectroscopy signal to be more diffuse or spread out at the spatial filter, the spectrometer may isolate or separate one or more portions of the spectroscopy signal for analysis by the detector using the spatial filter. The spatial filter, for example, may be configured to block or pass a portion of the spectroscopy signal (at least for one detection cycle). The portion of the spectroscopy signal may, for example, be analyzed by itself, in combination with all or one or more other portions of the spectroscopy signal and/or or in comparison with all or one or more other portions of the spectroscopy signal.

Figure 3B:
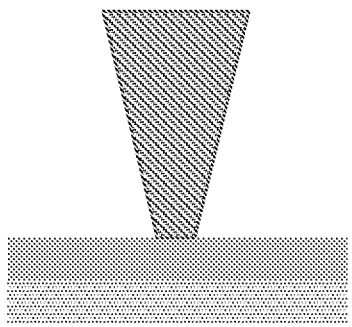
FIGS. 3A and 3B show examples embodiments of spectroscopy signals reflected from a complex sample, according to one or more embodiments shown and described herein.
Figure 3A:
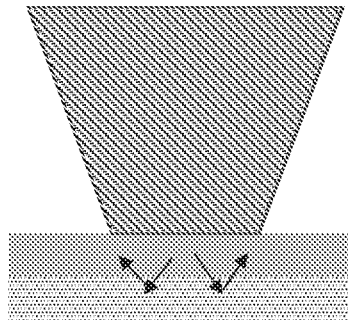

FIGS. 3A and 3B show examples of spectroscopy signals reflected from a complex sample. In these examples, the complex sample includes two or more layers, although any number of layers, discrete or gradual, may be present. The complex sample, for example, may include a container (outer) layer and contents (inner layer(s)) disposed within the container. The layer(s) may further comprise homogeneous or heterogeneous layer(s). Further, the complex sample, in some cases, may include different regions (e.g., identifiable by depth) where no discrete, independent layers are present. FIG. 3A, for example, shows a reflected spectroscopy signal received from an opaque or otherwise impenetrable outer layer of a complex sample. In this example, the spectroscopy signal may be imaged as a tightly focused spot or circle onto an aperture of a spatial filter, such as shown in FIG. 2A for example, and the spectral features of the spectroscopy signal will correspond the outer layer or portion of the complex sample nearest the spectrometer since the excitation signal does not penetrate through the outer layer of the complex sample.

FIG. 3B shows, in contrast, a reflected spectroscopy signal received from a translucent (to the excitation signal) outer layer of a complex sample. In this example, the excitation signal penetrates further into the complex sample (e.g., through the outer layer of the sample and into one or more inner layers of the sample) and the return spectroscopy signal is more diffuse than the example shown in FIG. 3A and includes spectral features corresponding to both the outer layer and the inner layer(s) of the complex sample. In this example, the return spectroscopy signal may be imaged onto a spatial filter in a more diffuse manner, such as shown in the examples of FIGS. 2B and 2C. While the spectral features of the overall spectroscopy signal will typically be dominated by the outer layer or region of the complex sample nearest the spectrometer, one or more portions of the return spectroscopy sample may be dominated by one or more of the inner layer(s) or region(s). Further, analysis such as a mixture match or principle component analysis may be used to identify various components of the combined spectral features even where one or more spectral features are dominated by other spectral features. Similarly, one or more look up tables may be used to identify various components of the complex sample based on one or more identified spectral features and/or the results of other analyses (e.g., mixture matching and/or principle component analysis).

FIG. 4 shows a schematic diagram of an example of a less focused or more diffusely imaged spectroscopy signal imaged on a spatial filter of a spectrometer. In this example, an excitation signal is directed toward a complex sample including an outer barrier layer or region and an inner subsurface layer or region (although the outer barrier layer/region and/or the inner subsurface layer/region may comprise more than one individual layer and/or region). Raman scattered light (or other spectroscopy signal) are returned as a Raman spectroscopy signal to the spectrometer and are imaged onto a spatial filter of the spectrometer in a less focused or more diffuse manner. In this particular example, an inner portion of the less focused or more diffusely imaged spectroscopy signal (shown in cross-hatch) is dominated by one or more spectral features corresponding to the outer barrier layer or region of the complex sample, while the dominance of those spectral feature(s) is reduced toward an outer region of the less focused or more diffusely imaged spectroscopy signal (shown as the lighter generally concentric region) on the spatial filter. In some implementations, the spectral features corresponding to the outer barrier layer or region may still be stronger than spectral features of the inner subsurface layer or region toward the outer region of the less focused or more diffusely imaged spectroscopy signal, may be about equal to the spectral features of the inner subsurface layer or region toward the outer region of the less focused or more diffusely imaged spectroscopy signal or may be weaker than spectral features of the inner subsurface layer or region toward the outer region of the less focused or more diffusely imaged spectroscopy signal. FIG. 4 also shows spectra corresponding to different areas of the less focused or more diffusely imaged spectroscopy signal passed from the spatial filter to a detector of the spectrometer. The top spectrum shown corresponds to a spectrum obtained if the inner portion of the spectroscopy signal (generally shown in cross-hatch) is passed from the spatial filter to the detector of the spectrometer. The bottom spectrum, in contrast, corresponds to a spectrum obtained if all or a portion of the outer/perimeter region of the spectroscopy signal (generally shown as the lighter generally concentric region) is passed from the spatial filter to the detector of the spectrometer.

Figures 5A, 5B:
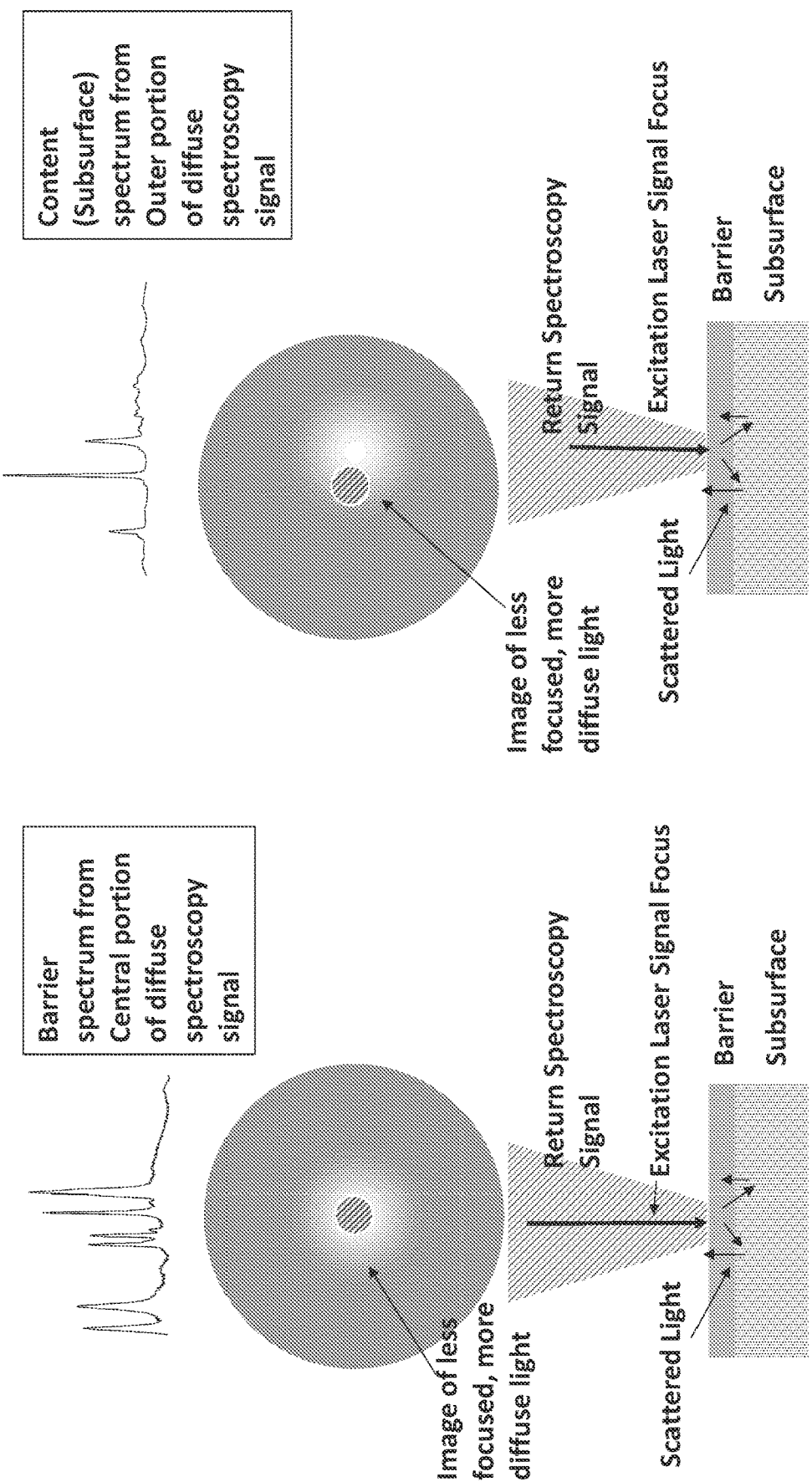
FIG. 5A shows a schematic diagram of an example implementation of a spatial filter of a spectrometer including an aperture, according to one or more embodiments shown and described herein.
FIG. 5B shows a schematic diagram of another example implementation of a spatial filter of a spectrometer including an aperture, according to one or more embodiments shown and described herein.

FIG. 5A shows an example implementation of a spatial filter of a spectrometer including an aperture. A less focused or more diffusely imaged spectroscopy signal (generally shown as a lighter concentric area) is directed onto the spatial filter. In this example, the less focused or more diffusely imaged spectroscopy signal is imaged generally concentrically around an aperture (shown in cross-hatch). In this example, the aperture of the spatial filter is positioned approximately in the center of the less focused or more diffusely imaged spectroscopy signal at the spatial filter. In this implementation, the portion of the less focused or more diffusely spectroscopy signal corresponding to the aperture is passed through the aperture and is directed toward a detector of the spectrometer (e.g., via an optical system including a diffraction grating). In FIG. 5A, for example, a spectrum of the portion of the less focused or more diffusely imaged spectroscopy signal passed to the detector is detected and, in this example, corresponds to the outer barrier layer or region of the complex sample.

FIG. 5B shows another example implementation of a spatial filter of a spectrometer including an aperture (shown in cross-hatch). Again, a less focused or more diffusely imaged spectroscopy signal (generally shown as a lighter concentric area) is directed onto the spatial filter. In this example, the less focused or more diffusely imaged spectroscopy signal is imaged such that the aperture (shown in cross-hatch) is positioned offset from the center of the less focused or more diffusely imaged spectroscopy signal (e.g., near an edge of the less focused or more diffusely imaged spectroscopy signal). In this example, the relative position/offset of the aperture of the spatial filter with respect to the less focused or more diffusely imaged spectroscopy signal may be obtained by moving (e.g., translating) the sample relative to the aperture of the spatial filter and/or altering a path of the less focused or more diffusely imaged spectroscopy signal. For example, the sample (e.g., a stage on which the sample is positioned) may be moved, the spatial filter may be moved, the aperture of the spatial filter may be moved relative to the spatial filter (e.g., opening an alternate aperture of a spatial filter and closing another aperture or sampling through multiple apertures) and/or moving or altering one or more optical component of the spectrometer disposed between the sample and the spatial filter to alter a path of the spectroscopy signal (e.g., within the spectrometer).

The portion of the less focused or more diffusely spectroscopy signal corresponding to the aperture passes through the aperture (shown in cross-hatch) and is directed toward a detector of the spectrometer (e.g., via an optical system including a diffraction grating). See, for example, FIG. 1. In FIG. 5B, for example, a spectrum of the portion of the less focused or more diffusely imaged spectroscopy signal passed to the detector is detected and, in this example, corresponds to the inner subsurface layer or region of the complex sample. In various implementations, the spectral feature(s) corresponding to the inner subsurface layer at the offset position of the aperture may, for example, be weaker than the spectral feature(s) corresponding to the outer barrier layer or region, may be about equal to the spectral feature(s) of the outer barrier layer or region or may be stronger than spectral features of the outer barrier layer or region. As discussed above, any number of analyses such as a mixture match and/or principle component analysis may be used to identify various components of the combined spectral features even where one or more spectral features are dominated by other spectral features. Similarly, one or more look up tables may be used to identify various components of the complex sample based on one or more identified spectral features and/or the results of other analyses (e.g., mixture matching and/or principle component analysis). In the particular example of FIG. 5B, for example, a spectrum of the portion of the less focused or more diffusely imaged spectroscopy signal passed to the detector is detected and, in this example, corresponds to the inner subsurface layer or region of the complex sample.

Figure 6:
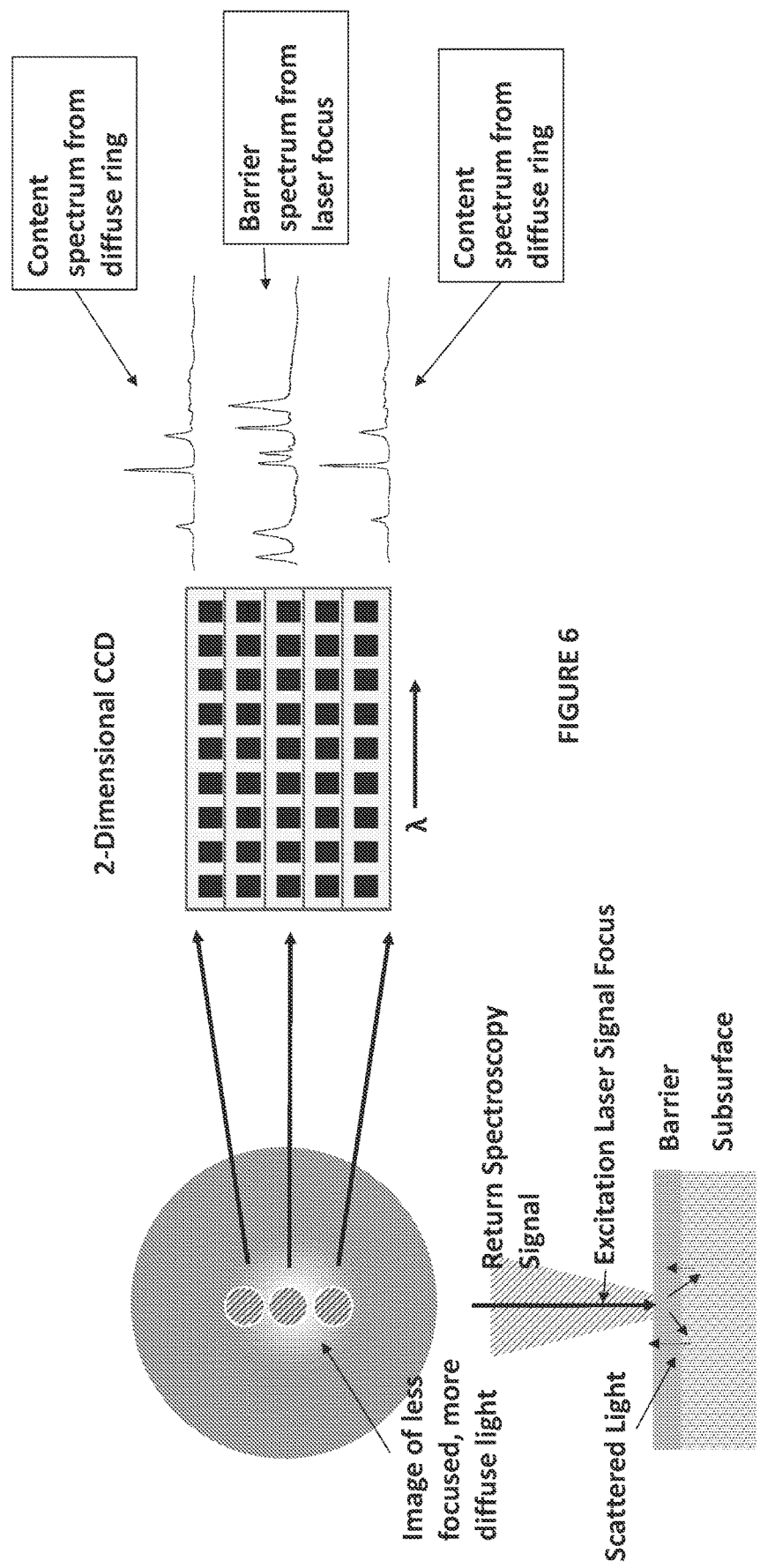
FIG. 6 illustrates a schematic view of another example implementation of a spectrometer including a spatial filter having a plurality of apertures, according to one or more embodiments shown and described herein.

FIG. 6 illustrates a schematic view of another example implementation of a spectrometer including a spatial filter having a plurality of apertures. In this particular implementation, for example, a portion of a less focused or more diffusely imaged spectroscopy signal passed through each of the multiple apertures of the spatial filter may be directed by an optical system of the spectrometer to different regions of a detector (e.g., different rows and/or columns of a charge coupled device (CCD) array detector). In other implementations, for example, one or more of the individual apertures may also be controllable in size, shape and/or state (e.g., open or closed) and, thus, the spatial filter of the spectrometer may be controlled to pass any portion(s) of the less focused or more diffusely imaged spectroscopy signal to the detector and block any other portion(s) of the less focused or more diffusely imaged spectroscopy signal from reaching the detector of the spectrometer.

Figure 7:
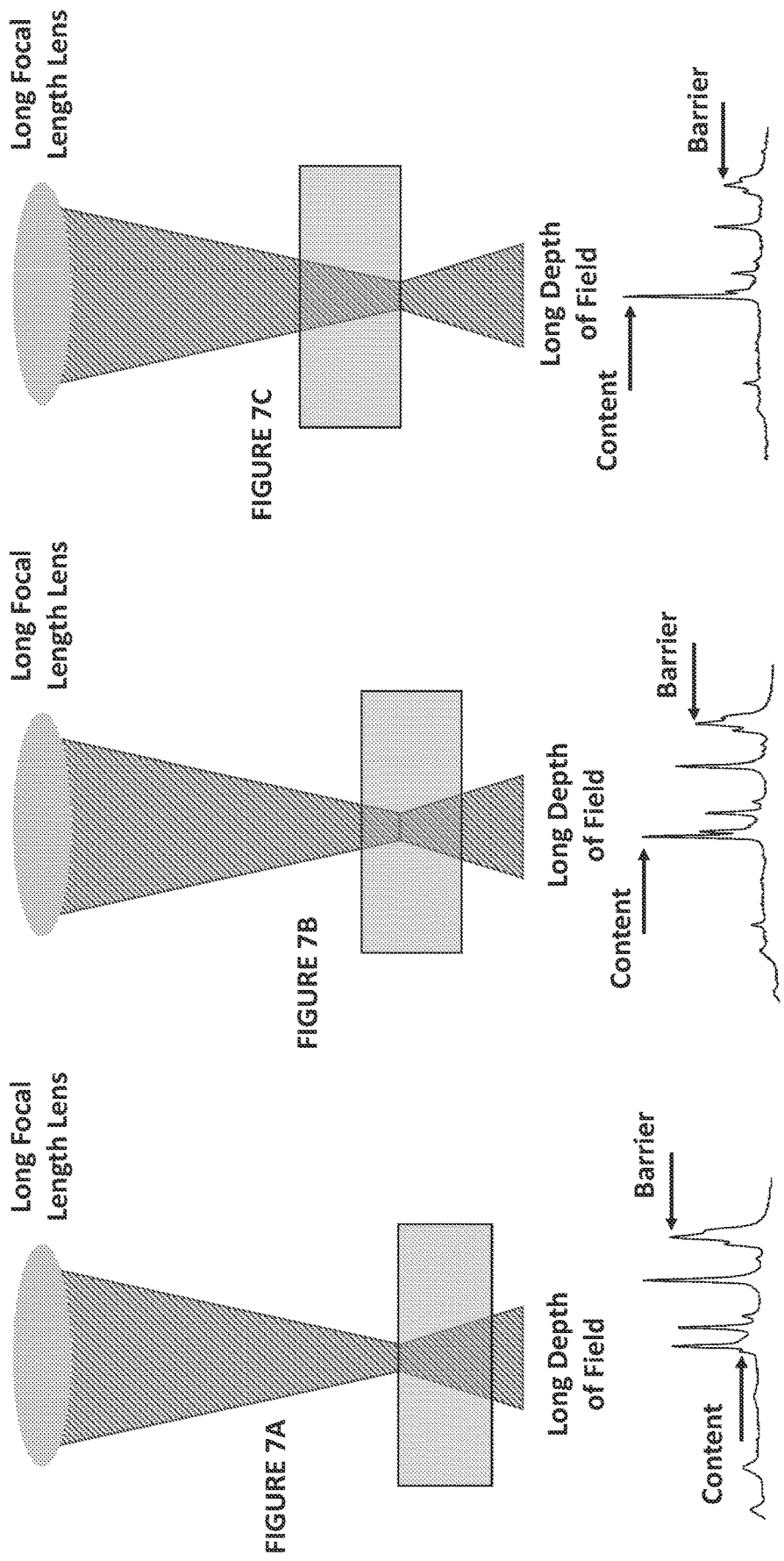
FIGS. 7A through 7C show schematic diagrams of yet another example implementation of a spectrometer configured to analyze a complex sample, according to one or more embodiments shown and described herein.

FIGS. 7A through 7C show yet another example implementation of a spectrometer configured to analyze a complex sample. In this implementation, for example, a focus of a collection lens of the spectrometer can be controlled to image varying depths of a complex sample to determine one or more spectral features corresponding to various layers or regions of the complex sample. In FIG. 7A, for example, a collection lens of the spectrometer configured to receive a spectroscopy signal from the sample is focused onto an outer barrier layer of the complex sample. A sample spectrum detected by the spectrometer for the focal point of the collection lens arrangement of FIG. 7A is shown in which spectral features corresponding to the outer barrier layer dominate the spectral features corresponding to the inner subsurface/content layer.

In FIG. 7B, however, the focal point of the collection lens is moved deeper into the complex sample than shown in FIG. 7A. In this implementation, a sample spectrum detected by the spectrometer for the focal point of the collection lens arrangement shown in FIG. 7B shows spectral features of the inner subsurface/content layer greater than the same spectral features of the inner subsurface/content layer detected in the arrangement shown in FIG. 7A. Similarly, the spectral features of the outer barrier layer were weaker than the same spectral features of the outer barrier layer detected in the arrangement shown in FIG. 7A.

In FIG. 7C, the focal point of the collection lens is moved even deeper into the complex sample than shown in FIGS. 7A and 7B. In this implementation, a sample spectrum detected by the spectrometer for the focal point of the collection lens arrangement shown in FIG. 7C shows spectral features of the inner subsurface/content layer greater than the same spectral features of the inner subsurface/content layer detected in the each of the arrangements shown in FIGS. 7A and 7B. Similarly, the spectral features of the outer barrier layer were weaker than the same spectral features of the outer barrier layer detected in the each of the arrangements shown in FIGS. 7A and 7B. Also, in the example shown in FIG. 7C, the spectral features of the inner subsurface/content were greater than the spectral features of the outer barrier layer of the complex sample.

Again as discussed above, any number of analyses such as a mixture match and/or principle component analysis may be used to identify various components of the combined spectral features even where one or more spectral features are dominated by other spectral features. Similarly, one or more look up tables may be used to identify various components of the complex sample based on one or more identified spectral features and/or the results of other analyses (e.g., mixture matching and/or principle component analysis).

Figure 8:
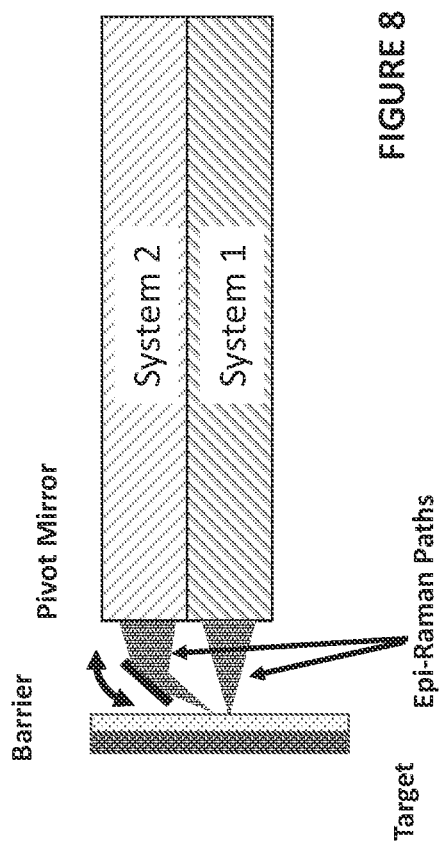
FIG. 8 shows a schematic diagram of another example implementation of a spectrometer system configured to analyze a complex sample, according to one or more embodiments shown and described herein.

FIG. 8 shows a schematic view of another example implementation of a spectrometer system configured to analyze a complex sample. In this implementation, for example, the spectrometer system comprises two spectrometers-a first spectrometer system and a second spectrometer system. The first system includes an epi-illumination spectrometer configured to provide an excitation signal (e.g., a laser excitation signal) on a zero offset angle directly to the complex sample. A pivot mirror (or other optical element) is configured to provide one or more offset angles for a spectrometer excitation signal. U.S. patent application Ser. No. 14/874,378 entitled "Spectrometer" filed by Carron et al. on Oct. 2, 2015 (the '378 application) describes a number of example implementations for using one or more non-zero offset angle to analyze one or more components, levels and/or regions of a complex sample. The '378 application is hereby incorporated by reference in its entirety for all it teaches and suggests as if fully set forth herein.

Figure 9A:
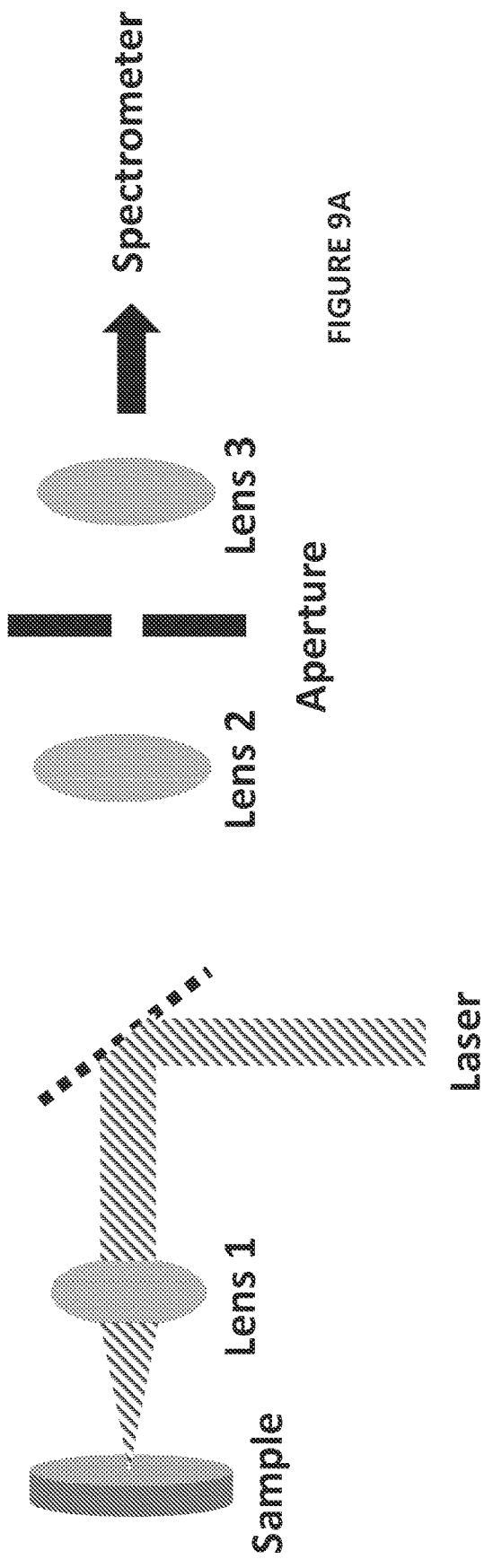
FIGS. 9A and 9B show schematic views of an example epi-illumination spectrometer implementation according to one or more embodiments shown and described herein.
Figure 9B:
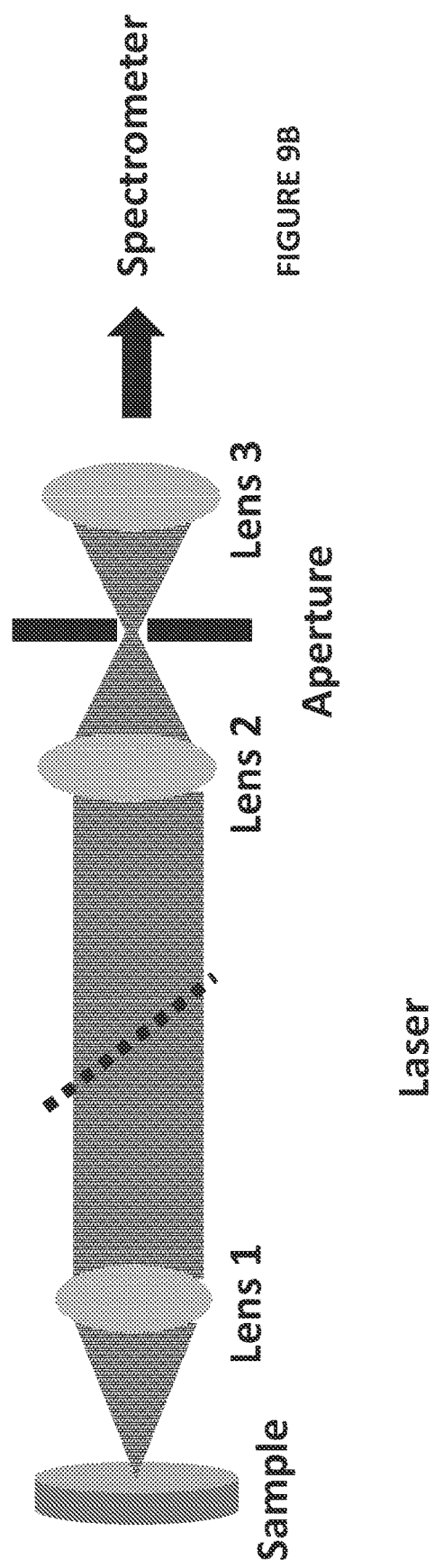

FIGS. 9A and 9B show schematic views of an example epi-illumination spectrometer implementation. In FIG. 9A, for example, an excitation source (e.g., a laser) directs an excitation signal (e.g., light beam, laser beam) toward a reflective optical element (e.g., a dichroic beam-splitter mirror, a mirror with an aperture). The reflective optical element (e.g., beam-splitter mirror) redirects the excitation signal toward an objective (e.g., an optical lens 1) that directs (e.g., focuses) the excitation signal toward a sample. As described herein, the focal point of the objective may be controlled to focus the excitation signal at one or more depths and/or regions of a complex sample of interest. As shown in FIG. 9B, the objective also receives a spectroscopy signal in return through the same collection objective. The received spectroscopy signal is directed through the reflective optical element (e.g., a dichroic beam-splitter mirror) toward a sample receiving optical system of the spectrometer. In the particular implementation shown in FIG. 9B, for example, a second objective (lens 2) focuses the spectroscopy signal toward a spatial filter (e.g., an aperture). As described herein, the spectroscopy signal may be loosely focused or more diffusely imaged (i.e., not in a tightly focused beam) to a region or area larger than the aperture of the spatial filter such that aperture(s) of the spatial filter may be used to pass one or more portion of the spectroscopy signal toward a detector of the spectrometer while blocking one or more other portions of the spectroscopy signal from continuing toward the detector of the spectrometer.

Figure 10:
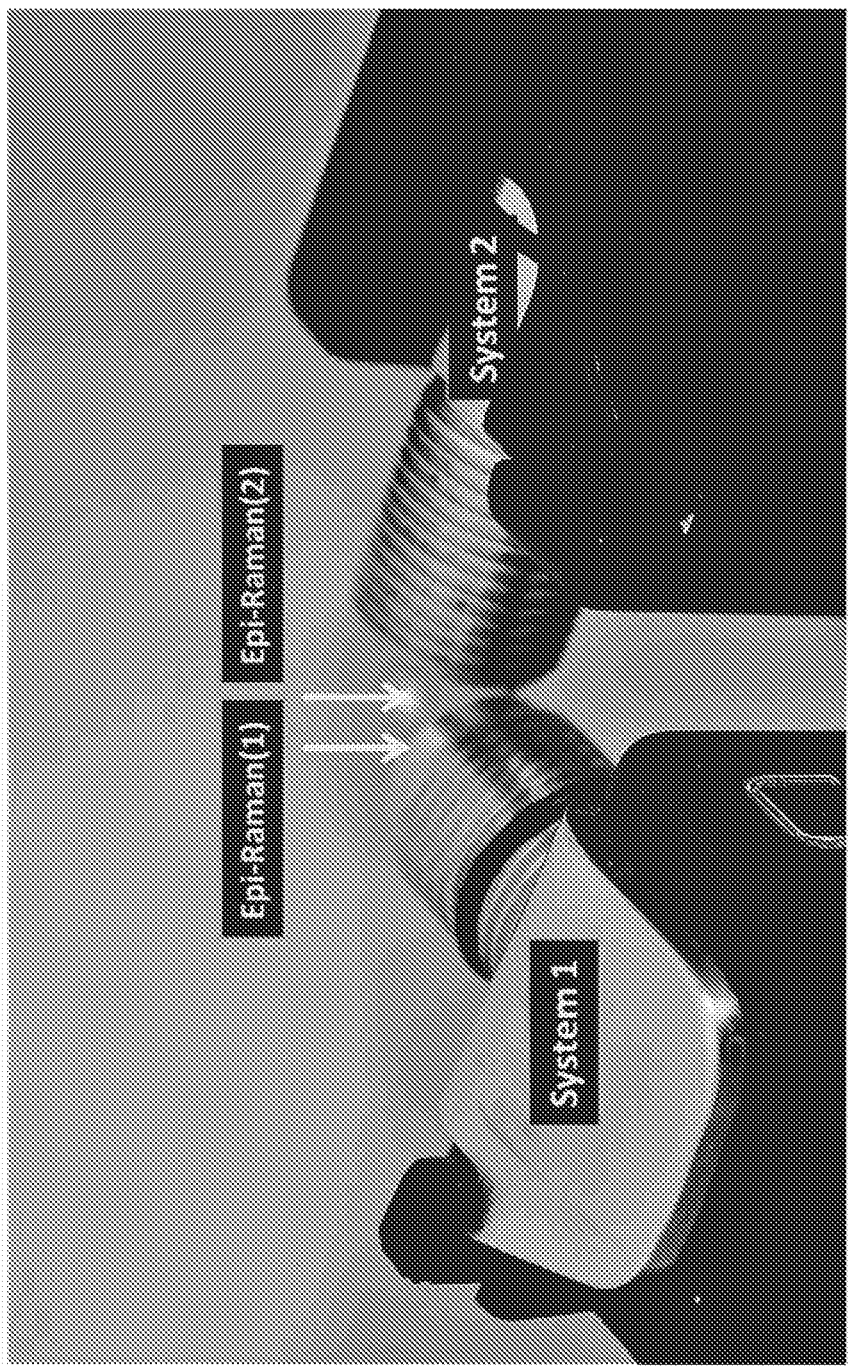
FIG. 10 illustrates an example of a multi-spectrometer arrangement such as shown in and described with reference to FIG. 8, according to one or more embodiments shown and described herein.

FIG. 10 illustrates an example of a multi-spectrometer arrangement such as shown in and described with reference to FIG. 8.

Figure 11:
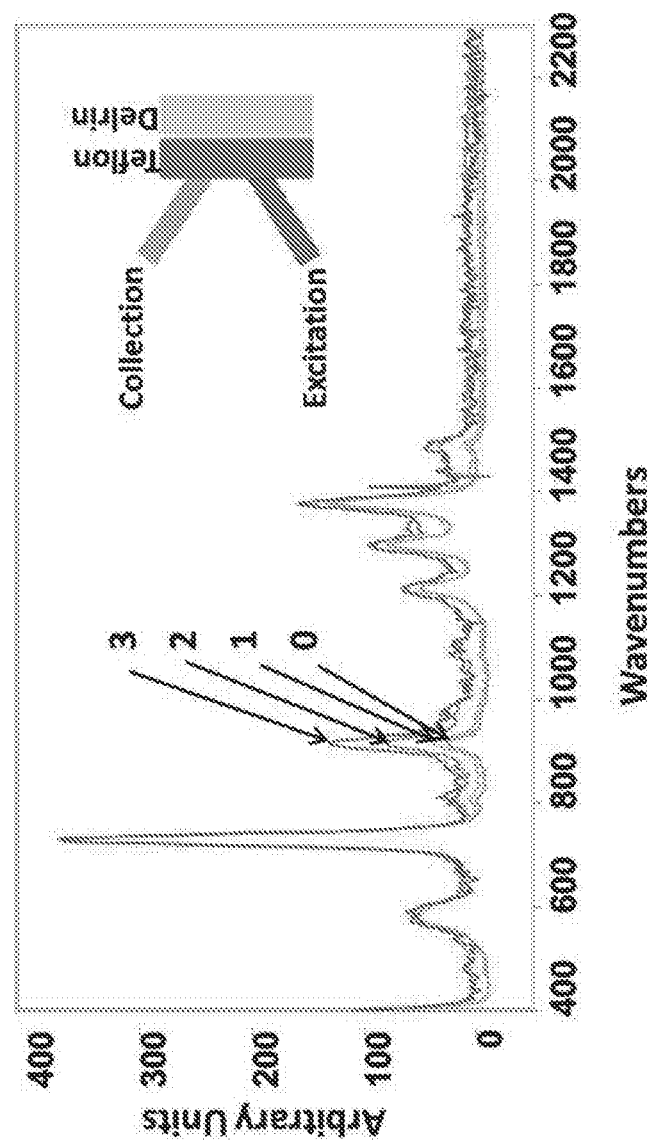
FIG. 11 shows a graph of experimental data of the implementation of a multi-spectrometer system shown in FIG. 10 for a complex sample including an outer barrier layer of Delrin and an inner subsurface layer of Teflon.

FIG. 11 shows a graph of experimental data of the implementation of a multi-spectrometer system shown in FIG. 10 for a complex sample including an outer barrier layer of Delrin and an inner subsurface layer of Teflon. The graph of FIG. 11 shows Raman spectra received by a spectrometer for different offsets of 0 mm, 1 mm, 2 mm and 3 mm.

Figure 12:
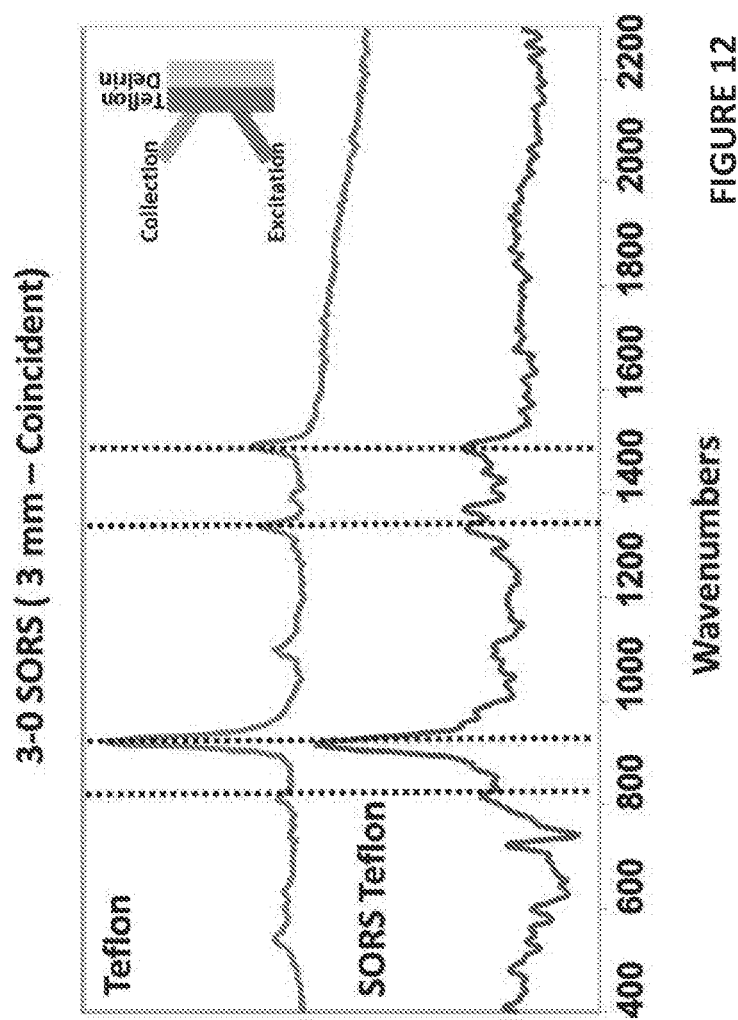
FIG. 12 shows a graph comparing a pure Raman spectrum of Teflon without a barrier layer, and a spatially offset Raman signal (SORS) spectrum detected through a Delrin barrier as described above with respect to FIG. 11.

FIG. 12 shows a graph comparing a pure Raman spectrum of Teflon without a barrier layer, and a spatially offset Raman signal (SORS) spectrum detected through a Delrin barrier as described above with respect to FIG. 11.

Figure 13:
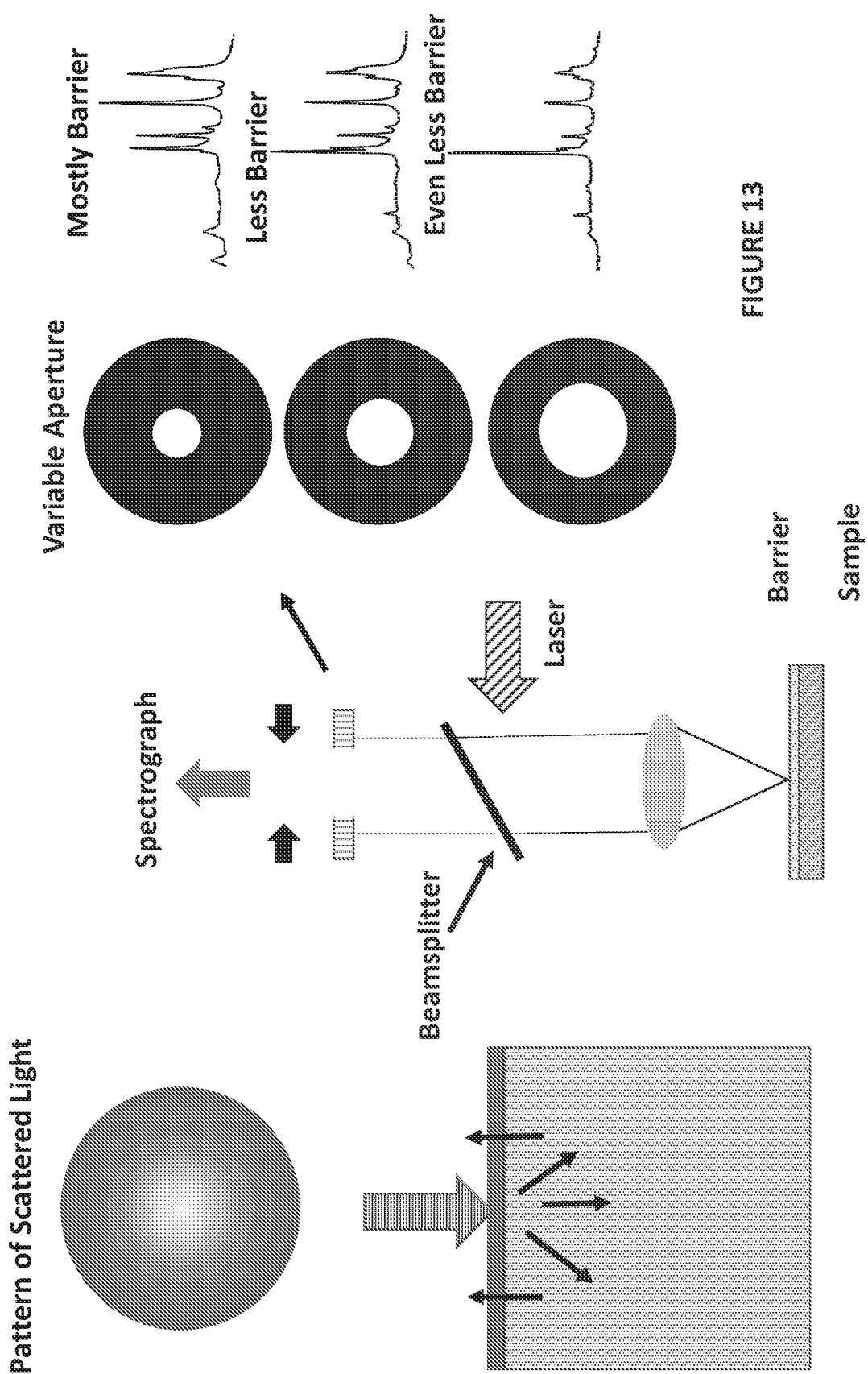
FIG. 13 shows a schematic view of yet another example implementation of a spectrometer configured to analyze a complex sample, according to one or more embodiments shown and described herein.

FIG. 13 shows a schematic view of yet another implementation of a spectrometer configured to analyze a complex sample. In this implementation, a spectrometer includes a spatial filter having a variable aperture. The aperture of the spatial filter is adjustable to collect different amounts of light depending on the size of the aperture used in a particular reading. The size of the aperture may be adjustable in any number of manners. The variable aperture may controlled electrically, mechanically, chemically or the like. In one implementation, for example, the aperture may be controlled via a motor (e.g., controllable by an electrical (e.g., current or voltage) control signal), an electrical control device, mechanical control device, a chemical response, an optical control device, or the like. In another implementation, the variable aperture may be defined by a diaphragm, an iris, a micro-electromechanical system, or any other type of aperture system. Predefined or variable aperture stops may also be used to control the size of the aperture for any particular sampling sequence of the spectrometer.

As shown in FIG. 13, an excitation source (e.g., a laser or other light source) provides an excitation signal to a beam-splitter that reflects the excitation signal toward an objective (e.g., a excitation/collection objective lens) that focuses the excitation signal toward the complex sample (e.g., a multi-layer and/or multi-region sample) and receives a spectroscopy signal in return through the same objective, which directs the spectroscopy signal to an internal optical system of the spectrometer. In a Raman spectroscopy application, for example, a Raman scattered light signal is received through the objective and directed to an internal optical system of the spectrometer.

In the implementation shown in FIG. 13, for example, the excitation/collection objective lens receives the spectroscopy signal from the sample and directs (e.g., collimates) the spectroscopy signal toward a beam-splitter. The beam-splitter allows the spectroscopy signal to pass through toward a spatial filter including the variable aperture. The size of the variable aperture may be controlled, such as the arrows shown in the example spectrometer schematic or by the different example sized apertures shown next to the spectrometer schematic. By opening or closing the aperture, respectively, more or less light of the spectroscopy signal is passed through the spatial filter toward the detector of the spectrometer.

As can be seen by the spectra shown adjacent the varying sized apertures, the size of the aperture correlates with magnitude of spectral feature(s) corresponding to one or more outer barrier layer or region of the complex sample relative to spectral feature(s) corresponding to one or more inner subsurface layers or regions of the complex sample. In the particular example shown in FIG. 13, for example, the spectrum output from the spectrometer for the first, relatively smallest aperture is dominated by spectral features corresponding to an outer barrier layer of the complex sample. For the next, relative middle-sized aperture, however, the dominance of the spectral features corresponding to the outer barrier of the complex sample is reduced. Finally, for the third, relatively largest aperture, the spectral features corresponding to the outer barrier layer are the least of the three examples. Similarly, for each progressively larger aperture the relative contribution of an inner subsurface/content layer or region is increased. Although three different aperture sizes are shown, this is merely an example. Any number of predefined or even a continuously variable aperture size may be used.

Figure 14:
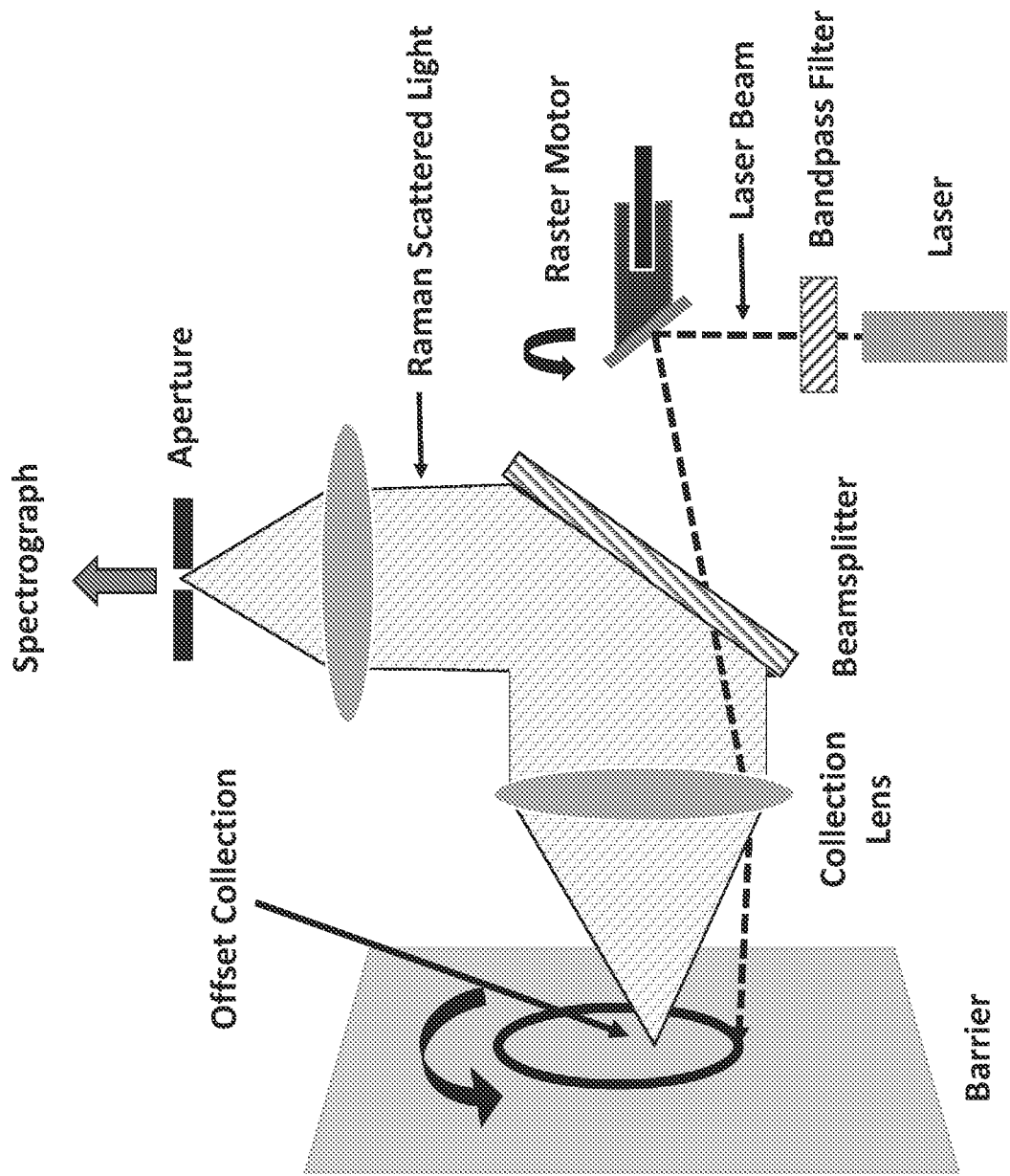
FIG. 14 shows a schematic view of another example implementation of a spectrometer configured to analyze a complex sample, according to one or more embodiments shown and described herein.

FIG. 14 shows a schematic view of another example implementation of a spectrometer configured to analyze a complex sample. In this implementation, for example, the spectrometer comprises an optical component configured to move an excitation signal (e.g., laser signal) relative to the complex sample. For example, a raster motor (as shown) may be adapted to move the excitation signal across the surface of the sample. Similarly, the sample may be moved (e.g., on a moveable stage) relative to the excitation signal.

In the implementation shown in FIG. 14, for example, a laser light source provides a laser light signal through a bandpass filter. The excitation signal is then reflected off a reflective surface of a raster motor that directs the excitation signal through a beam-splitter toward a collection lens. As can be seen in FIG. 14, the excitation signal is moved across a surface of the sample (e.g., in an orbital or other pattern, randomly, pseudo-randomly) and provides one or more offsets from location(s) of excitation relative to location(s) of collection. In the particular example shown in FIG. 14, for example, an orbital pattern is traced by the excitation signal and, as the excitation raster motor is rotated, a distance between an excitation location and a collection location for the collection lens will change, thus providing a variable offset distance between the excitation locations and the collection location.

FIG. 14 shows merely one example implementation of moving an excitation signal relative to a sample. Many other configurations and designs are described in detail in U.S. patent application Ser. No. 13/907,812 entitled "Spectrometer" filed by Carron et al. on May 31, 2013 (the '812 application), which is incorporated herein by reference for all it teaches and suggests as if fully set forth herein. Further, many other configurations and designs for taking spectra and identifying one or more element, component, layer, region or the like of a complex sample are further described in U.S. patent application Ser. No. 14/874,378 entitled "Spectrometer" filed by Carron et al. on Oct. 2, 2015 (the '378 application), which is also incorporated herein by reference for all it teaches and suggests as if fully set forth herein. Other configurations and designs for taking one or more spectrum of a complex sample are also described in U.S. Pat. No. 7,652,763 entitled "Apparatus for depth-selective Raman spectroscopy" to Matousek et al; U.S. Pat. No. 8,159,664 entitled "Apparatus for depth-selective Raman spectroscopy" to Matousek et al.; U.S. Pat. No. 8,248,600 entitled "Raman detection of container contents" to Matousek et al.; U.S. Pat. No. 8,085,396 entitled "Raman analysis" to Matousek et al; and U.S. Pat. No. 7,911,604 entitled "Security screening using Raman analysis" to Matousek et al., each of which is incorporated herein by reference for all it teaches and suggests as if fully set forth herein.

Further, analysis such as a mixture match or principle component analysis may be used to identify various components of the combined spectral features even where one or more spectral features are dominated by other spectral features. Similarly, one or more look up tables may be used to identify various components of the complex sample based on one or more identified spectral features and/or the results of other analyses (e.g., mixture matching and/or principle component analysis).

Figure 15B:
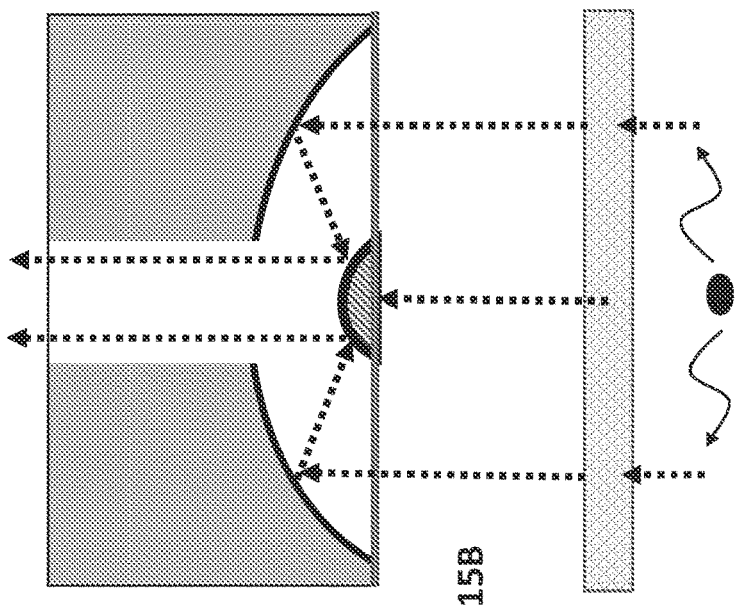
FIGS. 15A and 15B show schematic views of example implementations of a reflective objective that may be used as an excitation/collection objective in a spectrometer such as described herein, according to one or more embodiments shown and described herein.
Figure 15A:
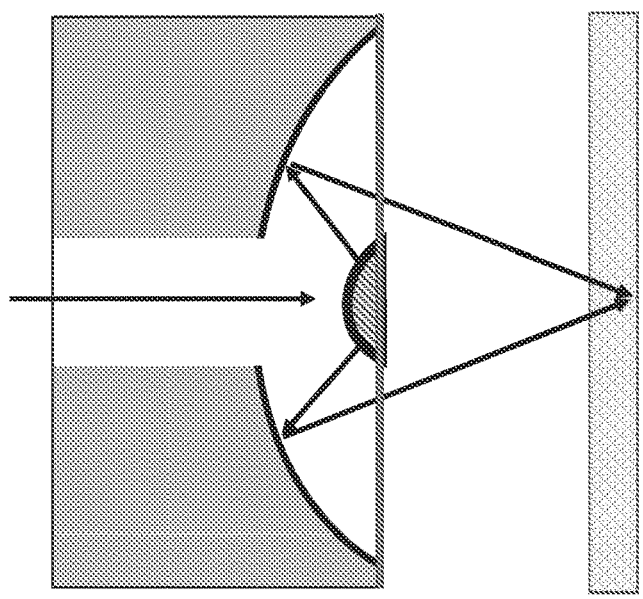

FIG. 15 shows a schematic view of an example implementation of a reflective objective that may be used as an excitation/collection objective in a spectrometer such as described herein. In this implementation, for example, an excitation signal is received and directed toward a first reflective surface and is reflected toward a second focusing reflective surface that redirects the excitation signal toward a sample. A portion of a spectroscopy signal is also received by the second reflective surface and redirected back to the first reflective surface and out of the objective in an opposite direction the excitation signal was received. In this implementation, for example, an opposing side of the first reflective signal also blocks a portion of the spectroscopy signal from returning to the optical system of the spectrometer. In this implementation, for example, the central portion of the spectroscopy signal corresponding to an excitation location is blocked, although in other designs, other portions of the spectroscopy signal may be similarly blocked at the collection objective in a similar manner.

Figure 16:
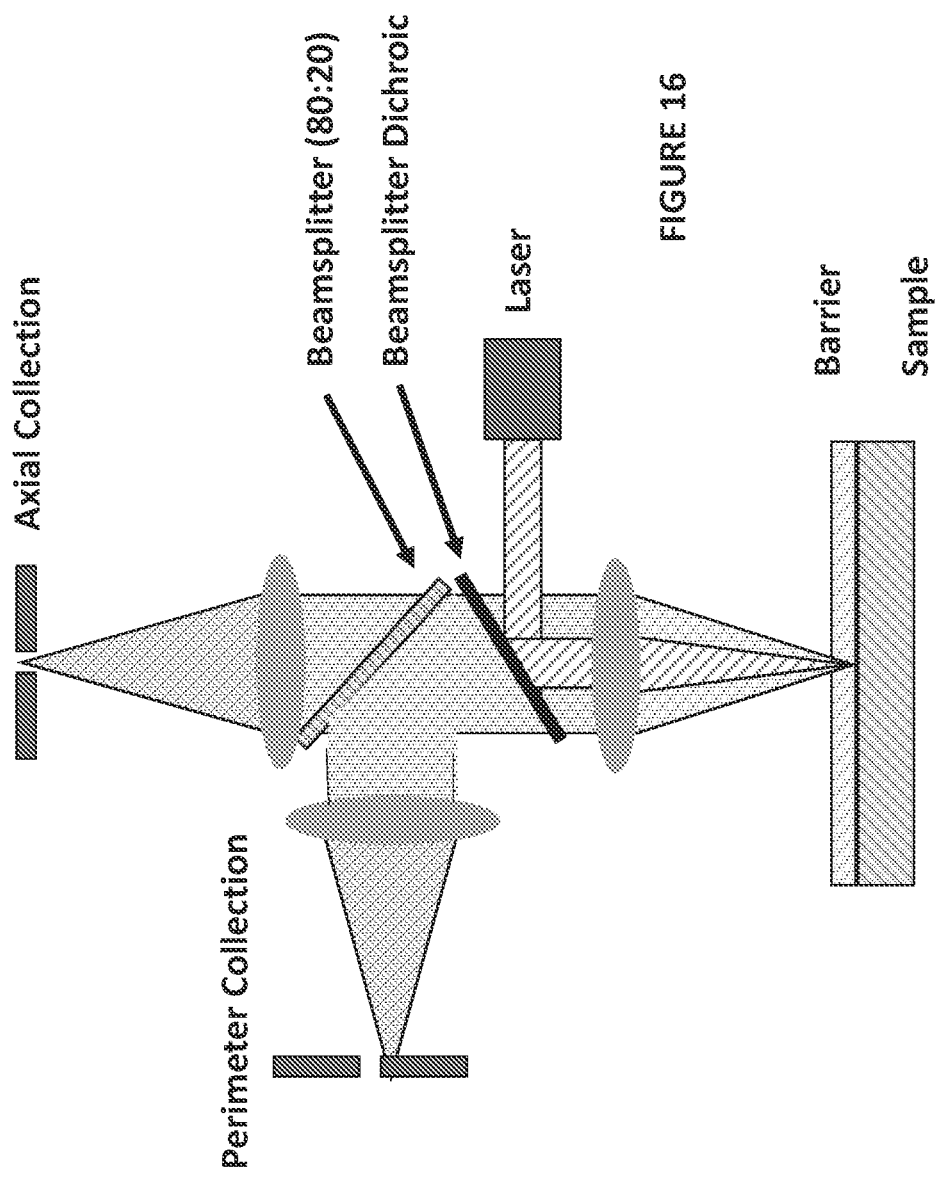
FIG. 16 shows a schematic view of yet another example implementation of a spectrometer configured to analyze a complex sample, according to one or more embodiments shown and described herein.

FIG. 16 shows a schematic view of yet another example implementation of a spectrometer configured to analyze a complex sample. In this particular implementation, for example, the spectrometer includes a laser excitation source that directs an excitation signal toward a first beam-splitter (e.g., a dichroic beam-splitter mirror). The first beam-splitter redirects the excitation signal toward an excitation/collection objective (e.g., lens) configured to focus the excitation signal toward the complex sample. A return spectroscopy signal is also received at the excitation/collection objective and directed through the first beam-splitter toward a second beam-splitter (e.g., a ratio beam-splitter such as an 80/20 beam-splitter). The second beam-splitter passes at least a first portion of the spectroscopy signal toward a first spatial filter (e.g., having a first aperture) and at least a second portion of the spectroscopy signal toward a second spatial filter (e.g., having a second aperture). In this implementation, for example, the first portion of the spectroscopy signal is focused by a first lens toward a first aperture of the first spatial filter. The first portion of the spectroscopy signal, in this example, is focused onto a first aperture of the first spatial filter. In this manner, as described above, the first spatial filter passes a portion of the spectroscopy signal having a relatively greater proportion of spectral feature(s) corresponding to an outer barrier layer or region of the complex sample. The second portion of the spectroscopy signal, however, is generally focused toward a location of the second spatial filter offset from a second aperture of the second spatial filter. In this case, the second spatial filter passes a portion of the spectroscopy signal having relatively higher contributions corresponding to an inner subsurface/contents layer or region of the complex sample than the portion of the spectroscopy signal passed by the first aperture of the first spatial filter.

Although multiple implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A spectrometer comprising:
    an excitation light source configured to provide an excitation signal;
    an optical system comprising at least one optical component configured to direct the excitation signal toward a sample comprising a plurality of features via an objective and to receive a spectroscopy signal from the sample via the objective, the optical system further comprising a spatial filter configured to separate or isolate at least one first portion of the spectroscopy signal corresponding to a first feature of the sample from at least one second portion of the spectroscopy signal corresponding to a second feature of the sample having a different depth within the sample than the first feature and pass the at least one first portion of the spectroscopy signal, wherein the spatial filter is controllable to selectively separate or isolate the at least one first portion of the spectroscopy signal; and
    a detector comprising at least one sensor configured to determine at least one spectral feature of the at least one first portion of the spectroscopy signal corresponding to the first feature of the sample.

2. The spectrometer of claim 1 wherein the spatial filter comprises at least one aperture.

3. The spectrometer of claim 2 wherein the spatial filter is controllable in order to move or translate the aperture of the spatial filter to selectively separate or isolate the at least one first portion of the spectroscopy signal.

4. The spectrometer of claim 2 wherein the aperture comprises a variable aperture.

5. The spectrometer of claim 4 wherein the variable aperture comprises at least one of a diaphragm and a microelectromechanical component.

6. The spectrometer of claim 1 wherein the spatial filter is controllable in order to move or translate the spatial filter to selectively separate or isolate the at least one first portion of the spectroscopy signal.

7. The spectrometer of claim 1 wherein the optical system is configured to image the spectroscopy signal on an optical component of the optical system.

8. The spectrometer of claim 1 wherein the optical system is configured to image the spectroscopy signal on a spatial filter comprising an aperture.

9. The spectroscopy signal of claim 1 wherein the optical system is configured to image the spectroscopy signal in a pattern on a spatial filter comprising an aperture, wherein the pattern is larger than the aperture of the spatial filter.

10. The spectrometer of claim 1 wherein the first feature and the second feature correspond to different layers disposed within the sample.

11. The spectrometer of claim 1 wherein the first feature and the second feature correspond to different regions identifiable by depth within the sample.

12. A method of isolating or separating a portion of a spectroscopy signal, the method comprising:
    providing an excitation light signal to a sample comprising a plurality of features;
    receiving a spectroscopy signal from the sample;
    imaging the spectroscopy signal onto a spatial filter comprising an aperture, the image of the spectroscopy extending beyond at least one border of the aperture; and
    separating at least a first portion of the spectroscopy signal corresponding to a first feature of the sample from the spectroscopy signal by passing the at least the first portion of the spectroscopy signal through the aperture while blocking at least a second portion of the spectroscopy signal corresponding to a second feature of the sample having a different depth within the sample than the first feature from passing through the spatial filter, wherein the spatial filter is controllable to selectively separate or isolate the at least one first portion of the spectroscopy signal.

13. A spectrometer comprising:
    an excitation light source configured to provide an excitation signal;
    an optical system comprising at least one optical component configured to direct the excitation signal toward a sample comprising a plurality of features disposed at varying depths within a sample via an objective, to receive a spectroscopy signal from the sample via the objective, the objective comprising a variable focal length;

a detector comprising at least one sensor adapted to detect at least a portion of the spectroscopy signal received via the optical system; and a controller configured to control the variable focal length of the objective with respect to a depth of the sample, the controller further configured to adjust the variable focal length of the objective such that a focal point of the objective extends into or through a subsurface layer, zone or region of a complex sample, wherein a first spectral feature corresponding to a first depth of the complex sample differs from a second spectral feature corresponding to the second depth of the complex sample and at least one of the first spectral feature and the second spectral feature is disposed below a surface of the complex sample in the subsurface layer, zone or region.

14. The spectrometer of claim 13, wherein the controller is configured to control the variable focal length of the objective by moving the objective relative to the sample.

15. The spectrometer of claim 13 wherein the subsurface layer, zone or region comprises contents of a container.

16. The spectrometer of claim 13 wherein the controller is adapted to identify at least one component of the first and second spectral features.

17. The spectrometer of claim 16 wherein the controller is adapted to utilize at least one of a mixture match analysis and a principal component analysis to identify the at least one component.

18. A method of detecting a subsurface layer, zone or region of a complex sample, the method comprising:

receiving a first spectroscopy signal from the complex sample;

adjusting a focal point of a variable focal length objective into or through a subsurface layer, zone or region disposed below a surface of the complex sample;

receiving a second spectroscopy signal from the complex sample; and determining at least one spectral feature from the spectroscopy signal corresponding to the subsurface layer, zone or region of the complex sample disposed below the surface of the complex sample, wherein a first spectral feature corresponding to a first depth within the complex sample differs from a second spectral feature corresponding to the second depth within the complex sample.

19. The method of claim 18 wherein the controller is adapted to identify at least one component of the first and second spectral features.

20. The method of claim 19 wherein at least one of a mixture match analysis and a principal component analysis is utilized to identify the at least one component.

* * * * *